(No Model.)

I. S. WILSON.
CROSSCUT SAW.

No. 481,321. Patented Aug. 23, 1892.

Witnesses
Harry L. Amer
Chas. S. Hyer

Inventor
Isaac S. Wilson
By his Attorneys,
C. A. Snow & Co.

UNITED STATES PATENT OFFICE.

ISAAC S. WILSON, OF CEDAR GAP, MISSOURI.

CROSSCUT-SAW.

SPECIFICATION forming part of Letters Patent No. 481,321, dated August 23, 1892.

Application filed March 17, 1892. Serial No. 425,327. (No model.)

*To all whom it may concern:*

Be it known that I, ISAAC S. WILSON, a citizen of the United States, residing at Cedar Gap, in the county of Wright and State of Missouri, have invented a new and useful Crosscut-Saw, of which the following is a specification.

This invention relates to certain new and useful improvements in crosscut-saws; and it consists of the construction and arrangement of the parts thereof, as will be more fully hereinafter described, and pointed out in the claims.

The object of this invention is to provide a saw of this character with such form of teeth that its operation during the cutting action will be rendered easy and rapid and sticking or dragging prevented.

Figure 1:
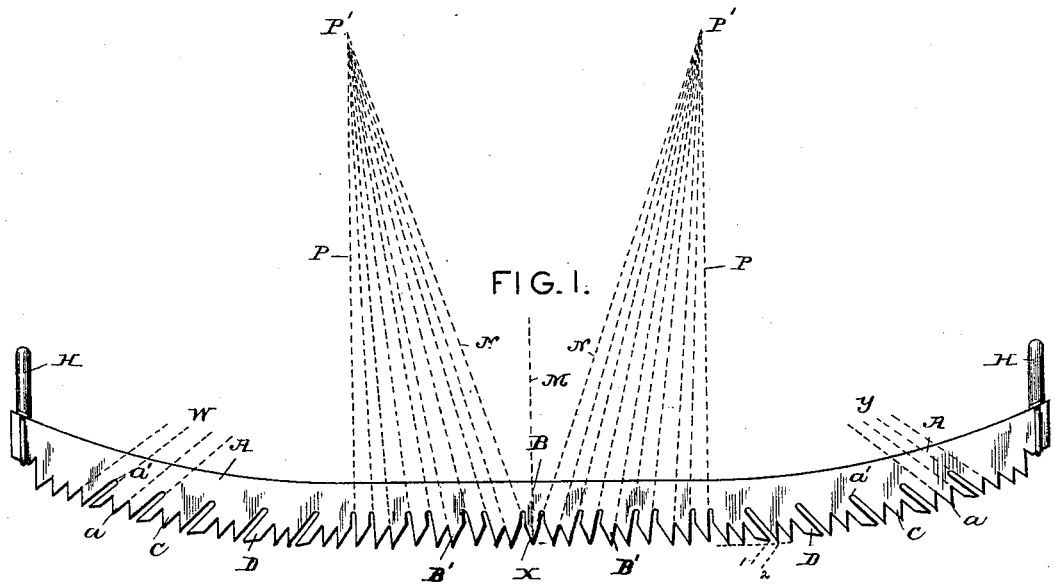
Figure 2:
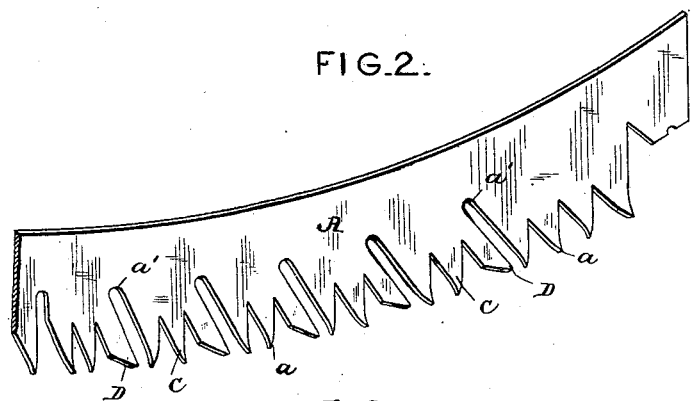
Figure 3:
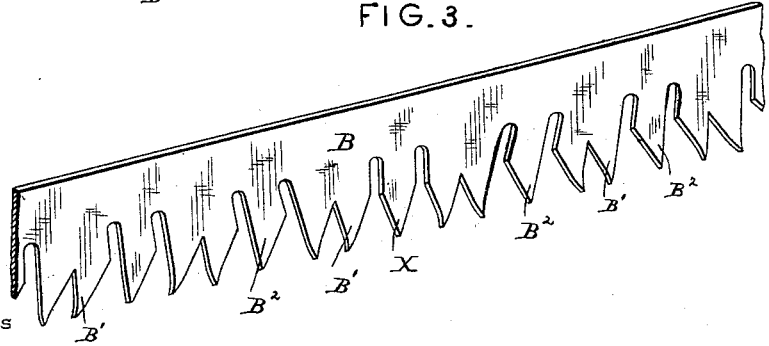

In the drawings, Figure 1 represents an elevation of a saw constructed in accordance with my invention. Fig. 2 is an enlarged perspective view of the outer curved portions of said saw. Fig. 3 is a similar view of the central portion of the saw.

Referring to the drawings, A represents the two outer curved sections of the saw, and B the central straight section, said sections being shown divided by dotted lines in Fig. 1. Each of the end sections A is formed with a series of cross-cutting beveled teeth C between the gage-heel of one clearing-tooth D and the throat of the adjacent tooth D. Each of the teeth C has a bent point $a$, and every other tooth is bent across the plane of the blade of the saw, the greatest slope of said teeth being located on the inner side thereof, or that side nearest the central section B of the saw. Between each of the last teeth of the series of cross-cutting teeth C and the clearing-teeth D is formed an extended throat $a'$, which is inclined in a plane parallel with the greatest sloped sides of said cross-cut teeth to compel the chips to drop from the saw as fast as it passes through the timber, and at the same time effectually carry said chips through the saw-kerf, and there being no means of holding the chips, owing to the inclined arrangement set forth, after the saw-teeth leave the timber said chips readily drop away from the saw. This prevents clogging of the saw, as will be readily understood. The cross-cutting teeth C are arranged in one or more pairs between the clearing-teeth D in each of the sections A and are arranged in opposite directions in the two sections A, as fully shown in Fig. 1.

The middle section B of the saw is formed as follows: A pyramidal clearing-tooth X is formed in the center of said section with a throat on each side thereof beyond the base of the same, and adjacent thereto are formed pairs of cross-cutting teeth B', which continue to the ends of the said section B and are intersected by a clearing-tooth $B^2$, having throats on each side thereof extending beyond the base of the same and between the contiguous pairs of cross-cutting teeth set forth. The slopes of said cross-cutting and clearing teeth in this straight section are arranged in opposite directions on each side of the said central pyramidal tooth X and are arranged in lines as to face and base, as will be more fully hereinafter set forth.

For the purpose of more fully and clearly explaining the construction and arrangement of the saw the parts A and B will be termed "thirds," the parts A being the outer thirds and the part B the center or inner third. The said middle third is straight on each edge of the desired width and the outer or end thirds are alike in contour, being curved from the edge on which the teeth are cut, so as to form the usual rotundity of saws of this class, and having the back to correspond with this curve, thus forming an arc of a circle in the general outline, but having the central portion straight on the edges, as shown in Fig. 1. In forming the teeth a line M, for example, is drawn through the blade of the saw at the center thereof, and other lines P P are drawn through the ends of the said central straight section or third parallel with said line M. The pyramidal tooth X is then formed with the line M as the center thereof and is made about one-eighth longer than it is wide at the base, the throats on each side thereof being beyond said base, as hereinbefore set forth. The lines N N are drawn from the slopes of the said pyramidal tooth X until they meet the lines P P at a point P'. The lines N when spaced equally from the said central pyramidal tooth and drawn to the point P' describe the sloping sides or faces of the teeth successively on the respective sides of said central tooth, and so continued to the lines P P, which form the vertical sides or faces of the terminating teeth of said central or middle third of the saw, which form cross-cut teeth at right angles with the central line of the saw, and are extended throughout the end thirds, as shown by lines W W and Y Y. The clearing-teeth D are formed by having their face edges toward the end of a saw to conform to a line parallel with the back of the contiguous cross-cut teeth, leaving a throat between the same for the purpose of forming a dust-space, and running deeper than or beyond the base thereof. The base of the clearing-tooth is the same width as the base of each of the cross-cut teeth, being trapezoidal in form, and said clearing-teeth are shorter than the said cross-cut teeth, as much as is described by the line 1 2, drawn from the point of each contiguous cross-cut tooth and of said clearing-teeth, said difference in length of the said teeth being as much as the rotundity of the saw between the contiguous cross-cut teeth. The clearing-teeth D and B² are beveled from either side to a point in the middle of the transverse central line thereof to give them the form of faces or edges, as shown in Figs. 2 and 3, so as to split out the wood cut off at either side of the kerf by the cross-cut or scoring teeth.

By means of the arrangement of clearing-teeth and cross-cut or scoring teeth combined in a set with said clearing-teeth and having their edges facing the ends of the saw-set at right angles with the line M of said saw, so as to prevent slipping over the work, as is done by the ordinary peg-tooth and which is materially dependent on the set of said cross-cut or scoring teeth, which, as shown, consists in bending each alternate tooth toward opposite sides of the saw and dressing the same in a manner as usually done. The clearing-teeth, being in the form as shown and described and beveled to a point in the middle, so as to run in the center of the kerf, are not bent or set to either side, and thereby split out the wood, but not plane it out, as is commonly done by saws of this form which have teeth wide at the points and causing the saw to run hard and jump by having to cut out the wood instead of splitting it out, as in the improved form herein set forth.

By the construction and arrangement of the teeth of the saw, as set forth, a cut is formed both in the forward and backward movement thereof, and owing to the curvature at the ends of the saw and the straight portion in the center thereof a regular and uniform cut is produced and convenience in the formation of the teeth is also thereby attained. This form of saw is very useful for handsaws, bucksaws, and for reciprocating cross-cut-saws for cutting large trees into logs and bolts, as for this latter use it is especially adapted and for which it is provided with handles H H, as is customary.

Having thus described my invention, what is claimed as new is—

1. A crosscut-saw having a central straight portion and curved end portions, substantially as described.

2. A crosscut-saw having a central straight portion with teeth projecting inward toward a central straight tooth and curved end portions with outwardly-projecting teeth, substantially as described.

3. A crosscut-saw having the teeth of the central part thereof projecting inward in reverse directions to a central tooth, substantially as described.

4. In a crosscut-saw, a middle portion with sets of cross-cut or scoring teeth arranged in even number, in combination with a clearing-tooth having a throat on either side thereof, said cross-cut or scoring teeth gradually assuming an erect position as they approach a central pyramidal tooth, substantially as described.

5. In a crosscut-saw, a central pyramidal tooth having cross-cut and clearing teeth projecting obliquely in reverse directions and outer cross-cut and clearing teeth projecting in reverse directions and obliquely to the said central cross-cut and clearing teeth, the central portion of said saw being straight and the end portions thereof curved, substantially as described.

In testimony that I claim the foregoing as my own I have hereto affixed my signature in the presence of two witnesses.

ISAAC S. WILSON.

Witnesses:
HORACE TRIMBLE,
I. M. BURRIS.